United States Patent
Shindo et al.

(10) Patent No.: US 12,276,349 B2
(45) Date of Patent: Apr. 15, 2025

(54) STEAM VALVE AND STEAM TURBINE PLANT

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Osamu Shindo, Yokohama Kanagawa (JP); Miyako Nimori, Yokohama Kanagawa (JP); Shunichi Horii, Yokohama Kanagawa (JP); Ryuhei Takemaru, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 172 days.

(21) Appl. No.: 18/075,075

(22) Filed: Dec. 5, 2022

(65) Prior Publication Data

US 2023/0184339 A1    Jun. 15, 2023

(30) Foreign Application Priority Data

Dec. 14, 2021  (JP) ................................. 2021-202347

(51) Int. Cl.
*F16K 3/26* (2006.01)
*F01D 17/10* (2006.01)
*F16K 3/314* (2006.01)

(52) U.S. Cl.
CPC .............. *F16K 3/262* (2013.01); *F16K 3/314* (2013.01); *F01D 17/10* (2013.01); *F05D 2220/31* (2013.01)

(58) Field of Classification Search
CPC .......... F16K 3/202; F16K 3/314; F16K 3/267; F16K 2200/202; F16K 47/04;
(Continued)

(56) References Cited

U.S. PATENT DOCUMENTS 4,315,526 A * 2/1982 Ohtomo .................. F16K 47/04
137/630.14
4,481,776 A * 11/1984 Araki .................... F01D 17/145
137/614.19

(Continued)

FOREIGN PATENT DOCUMENTS

EP    1 707 754 A2    10/2006
JP    S54-134921 U    9/1979
(Continued)

OTHER PUBLICATIONS

JP Office Action issued in corresponding Japanese Patent Application No. 2021-202347 dated Dec. 10, 2024 (8 pages).

*Primary Examiner* — Patrick C Williams
(74) *Attorney, Agent, or Firm* — Foley & Lardner LLP

(57) ABSTRACT

There are provided a steam valve and the like capable of preventing breakage of an auxiliary valve element and effectively suppressing the occurrence of a leak of steam in the auxiliary valve element. In the steam valve of an embodiment, the auxiliary valve element is structured to be in an open state in which the valve rod moves in an opening direction to increase a distance between an auxiliary-valve cap and a main valve element, thereby opening an auxiliary-valve steam introduction hole, and to be in a fully-closed state in which the valve rod moves in a closing direction in which the main valve element is closed to bring the auxiliary-valve cap and the main valve element into contact with each other, thereby closing the auxiliary-valve steam introduction holes. A contact position in which the auxiliary-valve cap and the main valve element are brought into contact with each other is located outside in a radial direction of the valve rod from the outer peripheral surface, of the auxiliary-valve tubular part, through which the auxiliary-valve steam introduction holes are formed.

7 Claims, 8 Drawing Sheets

(58) Field of Classification Search
CPC ........ F01D 17/10; F01D 17/145; F01D 17/18;
F01D 2220/31
See application file for complete search history.

(56) References Cited

U.S. PATENT DOCUMENTS

| | | | | |
|---|---|---|---|---|
| 5,005,605 | A * | 4/1991 | Kueffer | F16K 47/08 |
| | | | | 137/896 |
| 5,870,896 | A * | 2/1999 | Clark | F16K 47/08 |
| | | | | 137/625.3 |
| 2006/0005889 | A1 * | 1/2006 | Takahashi | F16K 1/36 |
| | | | | 137/625.39 |
| 2007/0235670 | A1 * | 10/2007 | Shindo | F16K 25/04 |
| | | | | 251/121 |
| 2008/0251140 | A1 | 10/2008 | Shindo | |

FOREIGN PATENT DOCUMENTS

| | | |
|---|---|---|
| JP | S55-166568 A | 12/1980 |
| JP | S57-151006 A2 | 9/1982 |
| JP | S6157442 A | 3/1986 |
| JP | S62-006402 U2 | 1/1987 |
| JP | 2006-046331 A | 2/2006 |
| JP | 2008-101516 A | 5/2008 |
| JP | 2019-183695 A | 10/2019 |

* cited by examiner

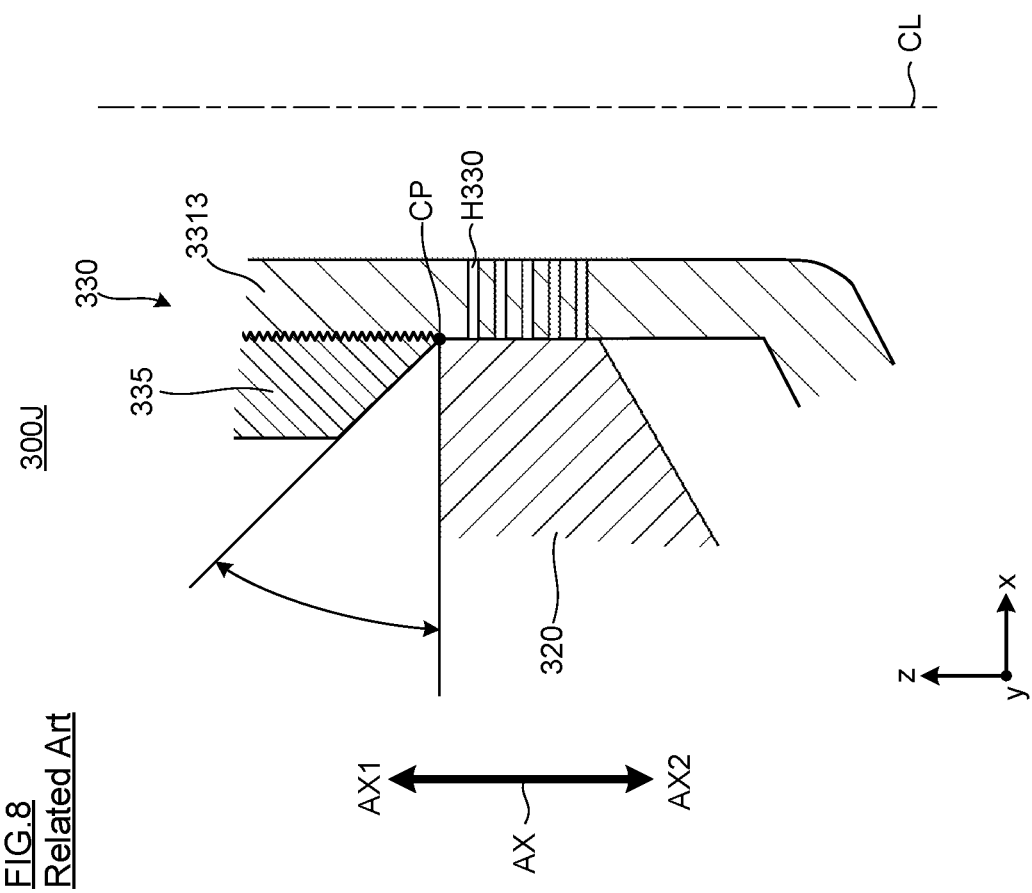

STEAM VALVE AND STEAM TURBINE PLANT

CROSS REFERENCE TO RELATED APPLICATIONS

This application is based upon and claims the benefit of priority from the prior Japanese Patent Application (No. 2021-202347), filed on Dec. 14, 2021; the entire contents of which are incorporated herein by reference.

FIELD

Embodiments described herein relate generally to a steam valve and a steam turbine plant.

BACKGROUND

In a steam turbine plant, a main steam stop valve and a steam control valve are installed at an inlet of a steam turbine. In starting the steam turbine, a warm-up operation is performed to prevent high thermal stress from being applied to the steam turbine.

The warm-up operation is performed by controlling a flow rate of steam with the main steam stop valve with the steam control valve in a fully-open state. The main steam stop valve has a main valve element and an auxiliary valve element, for example, and in the warm-up operation, by controlling an opening degree of the auxiliary valve element with the main valve element in a fully-closed state, the flow rate of steam passing through the main steam stop valve is regulated.

[A] Structure of Steam Valve 300J

FIG. 7 and FIG. 8 are sectional views schematically illustrating a steam valve (main steam stop valve) according to a related art. FIG. 7 illustrates a part of the cross section on a vertical plane (xz plane), and in FIG. 8, an area A in FIG. 7 is enlarged and illustrated. In FIG. 7 and FIG. 8, a longitudinal direction is a vertical direction z, a lateral direction is a first horizontal direction x, and a direction orthogonal to the paper sheet is a second horizontal direction y.

A steam valve 300J according to the related art is a main steam stop valve including a valve seat 310, a main valve element 320, an auxiliary valve element 330, and a valve rod 340, as illustrated in FIG. 7 and FIG. 8.

In the steam valve 300J according to the related art, the valve rod 340 moves in an opening direction AX1 in which the main valve element 320 is opened in an axial direction AX along a center axis CL of the valve rod 340, thereby increasing a distance between the main valve element 320 and the valve seat 310. Further, in the steam valve 300J, the valve rod 340 moves in a closing direction AX2 in which the main valve element 320 is closed in the axial direction AX, thereby reducing the distance between the main valve element 320 and the valve seat 310.

Further, in the related art, when the warm-up operation is performed on a steam turbine (whose illustration is omitted), in the steam valve 300J which is the main steam stop valve, by controlling an opening degree of the auxiliary valve element 330 with the main valve element 320 in a fully-closed state, a flow rate of steam is regulated. FIG. 7 illustrates the auxiliary valve element 330 in a fully-open state, and FIG. 8 illustrates the auxiliary valve element 330 in a fully-closed state.

The respective parts constituting the steam valve 300J will be described in order.

[A-1] Valve Seat 310

The valve seat 310 has, for example, a ring shape, and a valve hole K310 is formed therein. Here, the valve seat 310 is fixed coaxially with the valve rod 340 in the inside (valve chamber) of a valve casing (whose illustration is omitted).

[A-2] Main Valve Element 320

The main valve element 320 has, for example, a cylindrical shape, and is provided to be capable of abutting on the valve seat 310. Here, the main valve element 320 is coupled with one end (upper end in the figure) of the valve rod 340 so as to be coaxial with the valve rod 340 inside the valve casing (whose illustration is omitted). Further, inside the main valve element 320, an accommodation space S320 for accommodating the auxiliary valve element 330 is formed.

[A-3] Auxiliary Valve Element 330

The auxiliary valve element 330 is accommodated to be coaxial with the valve rod 340 in the accommodation space S320 formed inside the main valve element 320, and can slide in the axial direction AX. The auxiliary valve element 330 is structured such that steam is introduced from the outside thereof through an auxiliary-valve steam introduction hole H330 to an auxiliary-valve steam flow path F331, and the steam introduced to the auxiliary-valve steam flow path F331 flows out to the valve hole K310.

Here, the auxiliary valve element 330 includes an auxiliary-valve main body 331 and an auxiliary-valve cap 335.

[A-3-1] Auxiliary-Valve Main Body 331

In the auxiliary valve element 330, the auxiliary-valve main body 331 includes a first auxiliary-valve main body part 3311, a second auxiliary-valve main body part 3312, and a third auxiliary-valve main body part 3313.

The first auxiliary-valve main body part 3311 of the auxiliary-valve main body 331 has, for example, a cylindrical outer shape.

The second auxiliary-valve main body part 3312 of the auxiliary-valve main body 331 has, for example, a truncated conical outer shape, and is structured such that its diameter decreases from an outer diameter of the first auxiliary-valve main body part 3311 as it goes toward the opening direction AX1 in the axial direction AX.

The third auxiliary-valve main body part 3313 of the auxiliary-valve main body 331 has, for example, a cylindrical outer shape, and its outer diameter is the same as that of an end portion located on the opening direction AX1 side of the second auxiliary-valve main body part 3312.

Through the third auxiliary-valve main body part 3313, an auxiliary-valve steam introduction hole H330 is formed. The auxiliary-valve steam introduction hole H330 is formed through a portion, of the third auxiliary-valve main body part 3313, protruding from the main valve element 320 in the opening direction AX1 (auxiliary-valve tubular part). The auxiliary-valve steam introduction hole H330 is along a radial direction of the valve rod 340 (a direction orthogonal to the axial direction AX) so that the inside and the outside of the third auxiliary-valve main body part 3313 communicate between each other. That is, the auxiliary-valve steam introduction hole H330 is formed to be along the plane orthogonal to the center axis CL of the valve rod 340. The auxiliary-valve steam introduction hole H330 is two or more, and a plurality of them are spaced side by side in a circumferential direction of the valve rod 340, and a plurality of them are arranged side by side in the axial direction AX of the valve rod 340, and moreover, each of the auxiliary-valve steam introduction holes H330 precisely faces toward the center axis CL in any stage of the axial direction AX.

Further, on an outer peripheral surface of a portion located on the opening direction AX1 side from a portion in which the auxiliary-valve steam introduction holes H330 are formed through a portion, of the third auxiliary-valve main body part 3313, protruding from the main valve element 320, a male screw is formed.

Moreover, in the auxiliary-valve main body 331, the auxiliary-valve steam flow path F331 is formed. The auxiliary-valve steam flow path F331 includes a first auxiliary-valve steam flow path part F3311, a second auxiliary-valve steam flow path part F3312, and a third auxiliary-valve steam flow path part F3313.

In the first auxiliary-valve steam flow path part F3311, an end portion located on the closing direction AX2 side in the axial direction AX (bottom end) communicates with the valve hole K310 of the valve seat 310, and an end portion located on the opening direction AX1 side in the axial direction AX (top end) communicates with the second auxiliary-valve steam flow path part F3312. The first auxiliary-valve steam flow path part F3311 is two or more, and a plurality of the first auxiliary-valve steam flow path parts F3311 are spaced to surround the valve rod 340.

The second auxiliary-valve steam flow path part F3312 has, for example, a truncated conical shape, and is formed such that its diameter decreases as it goes toward the opening direction AX1 in the axial direction AX.

The third auxiliary-valve steam flow path part F3313 has, for example, a cylindrical shape, and its diameter is the same as that of an end portion located on the opening direction AX1 side of the second auxiliary-valve steam flow path part F3312. The third auxiliary-valve steam flow path part F3313 communicates with the auxiliary-valve steam introduction holes H330.

In the auxiliary-valve steam flow path F331, the steam introduced from the auxiliary-valve steam introduction hole H330 flows through the third auxiliary-valve steam flow path part F3313, the second auxiliary-valve steam flow path part F3312, and the first auxiliary-valve steam flow path part F3311 in order, to be discharged to the valve hole K310.

[A-3-2] Auxiliary-Valve Cap 335

The auxiliary-valve cap 335 is mounted at an end portion located on the opening direction AX1 side of the third auxiliary-valve main body part 3313 (auxiliary-valve tubular part) constituting the auxiliary-valve main body 331 (top end). The auxiliary-valve cap 335 is structured to block the third auxiliary-valve steam flow path part F3313 formed inside the third auxiliary-valve main body part 3313.

Here, the auxiliary-valve cap 335 includes a cap tubular body part 3351 and a cap plate-shaped body part 3352.

In the auxiliary-valve cap 335, the cap tubular body part 3351 is, for example, a cylindrical tubular body, and coaxial with the valve rod 340. On an inner peripheral surface of the cap tubular body part 3351, a female screw coupled with the male screw formed on the outer peripheral surface of the third auxiliary-valve main body part 3313 is formed.

In the auxiliary-valve cap 335, the cap plate-shaped body part 3352 is, for example, a disk-shaped body, and coaxial with the valve rod 340.

An outer peripheral surface of an end portion located on the opening direction AX1 side of the cap tubular body part 3351 (upper end) is along the center axis CL of the valve rod 340. In contrast to this, an outer peripheral surface of an end portion located on the closing direction AX2 side of the cap tubular body part 3351 (lower end) is an inclined surface inclined to the center axis CL of the valve rod 340, and in the inclined surface, the closing direction AX2 side is located further inside than the opening direction AX1 side in the radial direction of the valve rod 340.

[A-4] Valve Rod 340

The valve rod 340 is, for example, a cylindrical rod-shaped body, and its end portion located on the opening direction AX1 side (top end) is coupled with the auxiliary valve element 330 to be fixed to the auxiliary valve element 330 by using a locking pin 341. Further, the valve rod 340 extends in the axial direction AX so as to penetrate the valve hole K310.

[B] Operation of Auxiliary Valve Element 330

[B-1] Case where Auxiliary Valve Element 330 is Set to Fully-Open State

When the auxiliary valve element 330 is set to a fully-open state in the steam valve 300J according to the related art, the valve rod 340 is moved in the opening direction AX1 to increase the distance between the auxiliary-valve cap 335 and the main valve element 320, thereby opening all the auxiliary-valve steam introduction holes H 330, as illustrated in FIG. 7. This causes steam to be introduced from the auxiliary-valve steam introduction holes H330 to the auxiliary-valve steam flow path F331. In the third auxiliary-valve steam flow path part F3313 of the auxiliary-valve steam flow path F331, the steam flows from the outside to the inside in the radial direction through the plurality of auxiliary-valve steam introduction holes H330 to collide on the center axis CL. At a result, in the warm-up operation, in a state in which a flow speed of steam decreases, the steam is introduced from the auxiliary-valve steam flow path F331 to the steam turbine.

[B-2] Case where Auxiliary Valve Element 330 is Set to Fully-Closed State

In contrast to this, when the auxiliary valve element 330 is set to a fully-closed state in the steam valve 300J according to the related art, the valve rod 340 (refer to FIG. 7) is moved in the closing direction AX2 to make the auxiliary-valve cap 335 and the main valve element 320 abut on each other, thereby blocking all the auxiliary-valve steam introduction holes H 330, as illustrated in FIG. 8.

As illustrated in FIG. 8, in the steam valve 300J according to the related art, an abutting position CP at which the auxiliary-valve cap 335 and main valve element 320 abut on each other coincides with an outer peripheral surface of a portion, of the third auxiliary-valve main body part 3313 (auxiliary-valve tubular part), through which the auxiliary-valve steam introduction holes H330 are formed. That is, in the steam valve 300J according to the related art, when the auxiliary valve element 330 is set to the fully-closed state, a sharp tip located on the closing direction AX2 side of the auxiliary-valve cap 335 collides with a flat surface located on the opening direction AX1 side of the main valve element 320.

In the steam valve 300J according to the related art, when the collision between the auxiliary-valve cap 335 and the main valve element 320 is repeated, the tip located on the closing direction AX2 side of the auxiliary-valve cap 335 is sometimes broken. As a result, a leak of steam occurs, and the steam valve 300J sometimes fails to set the auxiliary valve element 330 precisely to the fully-closed state.

Therefore, a problem to be solved by the present invention is to provide a steam valve and a steam turbine plant capable of preventing breakage of an auxiliary valve element and effectively suppressing the occurrence of a leak of steam in the auxiliary valve element.

BRIEF DESCRIPTION OF THE DRAWINGS

FIG. 8 is a sectional view schematically illustrating the steam valve (main steam stop valve) according to the related art.

DETAILED DESCRIPTION

A steam valve of an embodiment includes:
a main valve element capable of abutting on a valve seat;
an auxiliary valve element accommodated inside the main valve element, and inside which an auxiliary-valve steam flow path is formed; and
a valve rod coupled with the auxiliary valve element, and penetrating a valve hole formed in a valve seat,
the auxiliary valve element includes:
an auxiliary-valve tubular part being a part capable of protruding from the main valve element in an opening direction in which the main valve element is opened;
an auxiliary-valve steam introduction hole formed through the auxiliary-valve tubular part, and through which steam is introduced to the auxiliary-valve steam flow path; and
an auxiliary-valve cap mounted at an end portion on the opening direction side of the auxiliary-valve tubular part,
the auxiliary valve element is structured to be in an open state in which the valve rod moves in the opening direction to increase a distance between the auxiliary-valve cap and the main valve element, thereby opening the auxiliary-valve steam introduction hole, and
to be in a fully-closed state in which the valve rod moves in a closing direction in which the main valve element is closed to bring the auxiliary-valve cap and the main valve element into contact with each other, thereby closing the auxiliary-valve steam introduction holes, and
a contact position in which the auxiliary-valve cap and the main valve element are brought into contact with each other is located outside in a radial direction of the valve rod from the outer peripheral surface, of the auxiliary-valve tubular part, through which the auxiliary-valve steam introduction holes are formed.

First Embodiment

[A] Structure of Steam Turbine Plant

Figure 1:
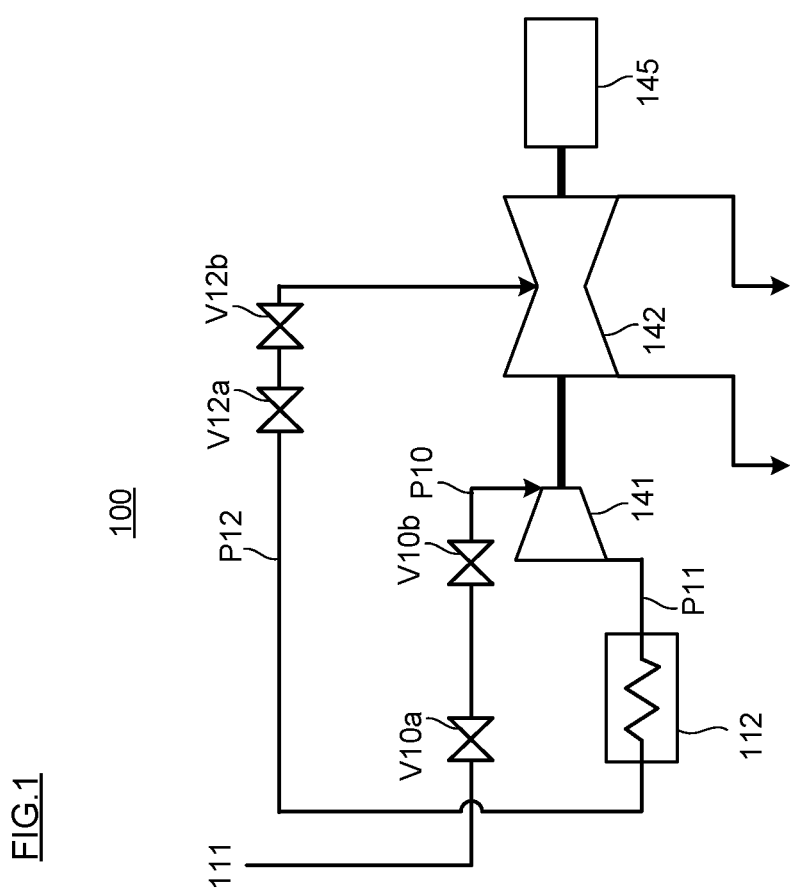
FIG. 1 schematically illustrates the entire structure of a steam turbine plant according to a first embodiment.

FIG. 1 schematically illustrates the entire structure of a steam turbine plant according to a first embodiment.

In a steam turbine plant 100 of this embodiment, as illustrated in FIG. 1, the steam heated by a steam generator 111 is introduced as a working fluid to a high-pressure turbine 141 via a main steam pipe P10 in which a main steam stop valve V10a and a steam control valve V10b are installed, to work in the high-pressure turbine 141. Then, the steam discharged from the high-pressure turbine 141 is supplied to a reheater 112 via a low-temperature reheat steam pipe P11, to be heated in the reheater 112 again. The steam heated by the reheater 112 is introduced as the working fluid to an intermediate-pressure turbine 142 via a high-temperature reheat steam pipe P12 in which a reheat steam stop valve V12a and an intercept valve V12b are installed, to work in the intermediate-pressure turbine 142. In the steam turbine plant 100, a turbine rotor is connected between the high-pressure turbine 141, the intermediate-pressure turbine 142, and a low-pressure turbine (whose illustration is omitted), and the turbine rotor is rotated by steam work. Then, the rotation of the turbine rotor drives a generator 145 to generate electricity.

[B] Structure of Steam Valve 300

Figure 2:
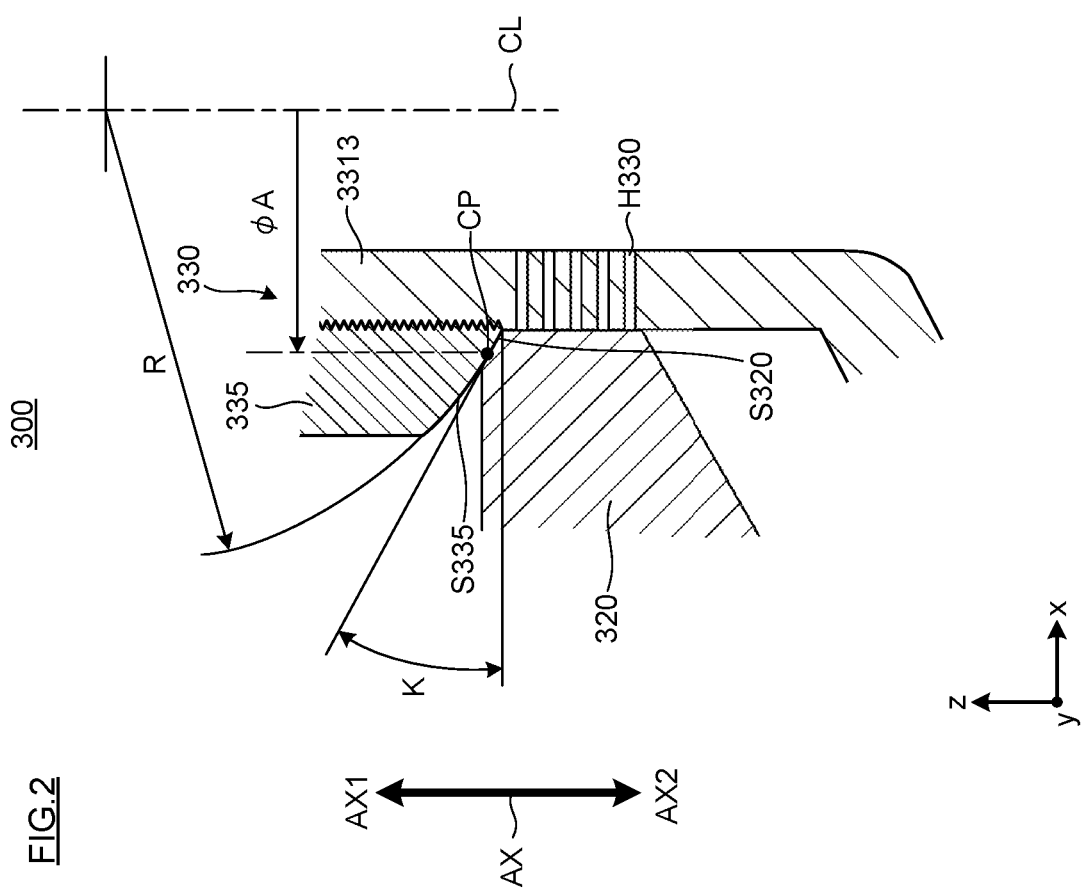
FIG. 2 is a sectional view schematically illustrating a steam valve (main steam stop valve) according to the first embodiment.

FIG. 2 is a sectional view schematically illustrating a steam valve (main steam stop valve) according to the first embodiment. In FIG. 2, a part of the cross section on a vertical plane (xz plane) is enlarged and illustrated, as in FIG. 8.

Figure 7:
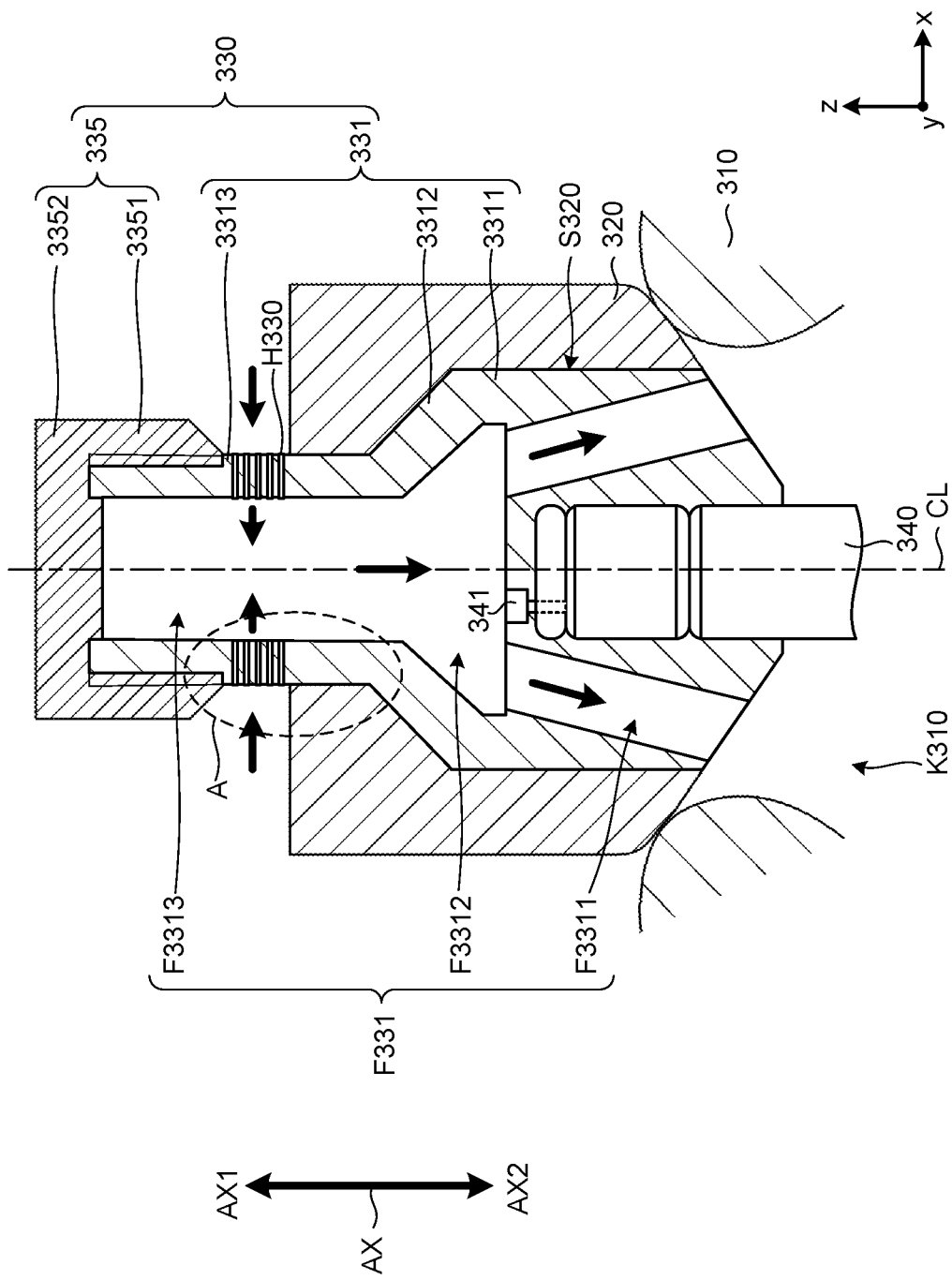
FIG. 7 is a sectional view schematically illustrating a steam valve (main steam stop valve) according to a related art.

A steam valve 300 of this embodiment corresponds to the main steam stop valve V10a constituting the steam turbine plant 100 illustrated in FIG. 1. Although illustration of the entire structure of the steam valve 300 of this embodiment is omitted, the steam valve 300 of this embodiment is a main steam stop valve including a valve seat 310, a main valve element 320, an auxiliary valve element 330, and a valve rod 340, as in the case of the related art. Further, the auxiliary valve element 330 includes an auxiliary-valve main body 331 and an auxiliary-valve cap 335 in the steam valve 300 of this embodiment, as in the case of the related art (refer to FIG. 7).

However, as illustrated in FIG. 2, in the steam valve 300 of this embodiment, an abutting position CP in which the auxiliary-valve cap 335 and the main valve element 320 abut on each other is different from that of the related art (refer to FIG. 8). Except for this point and points related thereto, this embodiment is the same as the case of the related art (refer to FIG. 7, FIG. 8). Therefore, descriptions of overlapped matters are appropriately omitted.

As illustrated in FIG. 2, the abutting position CP in which the auxiliary-valve cap 335 and the main valve element 320 abut on each other in the steam valve 300 of this embodiment is different from that of the related art (refer to FIG. 8), and does not coincide with an outer peripheral surface of a portion, of the third auxiliary-valve main body part 3313 (auxiliary-valve tubular part), through which the auxiliary-valve steam introduction holes H330 are formed. In the steam valve 300 of this embodiment, the abutting position CP in which the auxiliary-valve cap 335 and the main valve element 320 abut on each other is located outside in a radial direction of the valve rod 340 from the outer peripheral surface of the portion, of the auxiliary-valve tubular part 3313, through which the auxiliary-valve steam introduction holes H330 are formed.

Concretely, the portion in which auxiliary-valve cap 335 abuts on the main valve element 320 (abutting position CP) is located on a curved surface S335 based on a sphere with a radius R having the center on the center axis CL of the valve rod 340. In the above-described curved surface S335, a portion located inside in the radial direction of the valve rod 340 is located on the closing direction AX2 side, and a portion located outside in the radial direction of the valve rod 340 is located on the opening direction AX1 side.

Further, in this embodiment, the portion in which the main valve element 320 abuts on the auxiliary-valve cap 335 (abutting position CP) is located on an inclined surface S320 inclined at an inclination angle K to a plane orthogonal to the center axis CL of the valve rod 340. On the above-described inclined surface S320, a portion located inside in the radial direction of the valve rod 340 is located on the closing direction AX2 side, and a portion located outside in the radial direction of the valve rod 340 is located on the opening direction AX1 side.

Hence, in this embodiment, the auxiliary-valve cap 335 and the main valve element 320 are brought into line contact with each other in the abutting position CP of a diameter ϕA, which is located outside in the radial direction of the valve rod 340 from the outer peripheral surface of the portion, of the auxiliary-valve tubular part 3313, through which the auxiliary-valve steam introduction holes H330 are formed.

[C] Summary

As described above, in the steam valve 300 of this embodiment, the abutting position CP in which the auxiliary-valve cap 335 and the main valve element 320 abut on each other is located outside in the radial direction of the valve rod 340 from the outer peripheral surface of the portion, of the auxiliary-valve tubular part 3313, through which the auxiliary-valve steam introduction holes H330 are formed. In this embodiment, the portion in which the auxiliary-valve cap 335 abuts on the main valve element 320 (abutting position CP) is not a sharp tip.

Therefore, in the steam valve 300 of this embodiment, when the auxiliary valve element 330 is set to a fully-closed state, the portion in which the auxiliary-valve cap 335 abuts on the main valve element 320 is not a sharp tip, and hence, even though the collision between the auxiliary-valve cap 335 and the main valve element 320 is repeated, breakage is less likely to occur in the auxiliary-valve cap 335. As a result, in this embodiment, since the auxiliary valve element 330 can be set precisely to the fully-closed state, it is possible to effectively prevent a leak of steam from occurring.

Further, in this embodiment, the portion in which the auxiliary-valve cap 335 abuts on the main valve element 320 (abutting position CP) is the curved surface S335 based on the sphere having the center on the center axis CL of the valve rod 340. This allows easy processing of the curved surface S335. Moreover, when the auxiliary valve element 330 is fully closed, the auxiliary valve element 330 and the auxiliary-valve cap 335 integrated with the valve rod 340 slide along the truncated cone-shaped inclined surface S320 up to a positional relationship to be concentric with, namely, aligned with the center of the main valve element 320 so as to go toward a tip of the truncated conical shape (the center axis CL of the valve rod 340). This results in that the auxiliary-valve cap 335 and the main valve element 320 adhere to (is brought into close contact with) each other securely in the abutting position CP, thereby allowing a remarkable improvement in steam sealing performance.

[D] Modified Example

The above embodiment describes a case where the portion in which the main valve element 320 abuts on the auxiliary-valve cap 335 (abutting position CP) is the inclined surface S320 inclined to the plane orthogonal to the center axis CL of the valve rod 340, but this is not restrictive. The portion in which the main valve element 320 abuts on the auxiliary-valve cap 335 (abutting position CP) need not be the flat inclined surface S320, but may be a curved surface facing (opposite to) the curved surface S335.

Second Embodiment

[A] Structure of Steam Valve 300b

Figure 3:
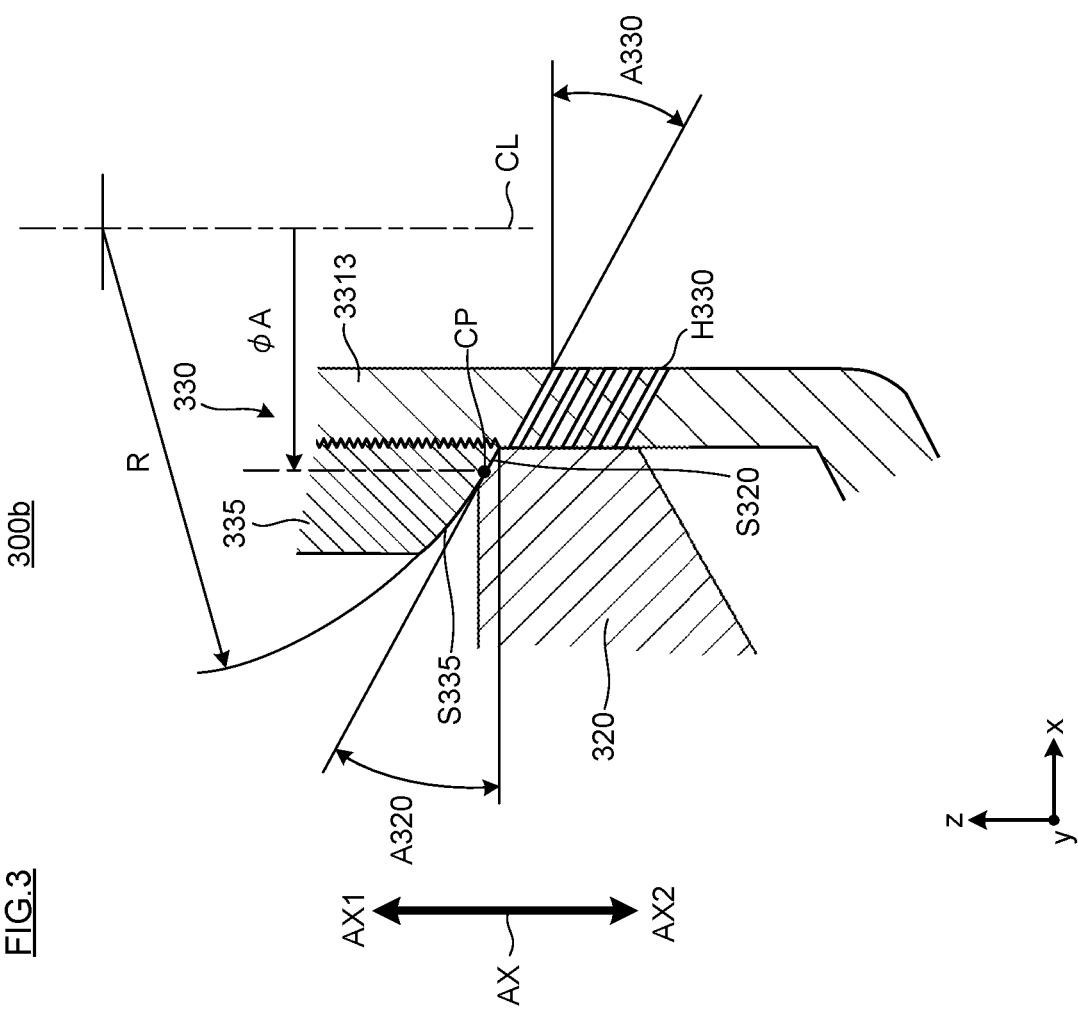
FIG. 3 is a sectional view schematically illustrating a steam valve (main steam stop valve) according to a second embodiment.

FIG. 3 is a sectional view schematically illustrating a steam valve (main steam stop valve) according to a second embodiment. In FIG. 3, a part of the cross section on a vertical plane (xz plane) is enlarged and illustrated, as in FIG. 2.

In a steam valve 300b of this embodiment, as illustrated in FIG. 3, a structure of an auxiliary-valve steam introduction hole H330 is different from that of the first embodiment. Except for this point and points related thereto, this embodiment is the same as the case of the first embodiment (refer to FIG. 2). Therefore, descriptions of overlapped matters are appropriately omitted.

As illustrated in FIG. 3, in the steam valve 300b of this embodiment, the auxiliary-valve steam introduction hole H330 is formed to be inclined to a plane orthogonal to a center axis CL of a valve rod 340. Here, in the auxiliary-valve steam introduction hole H330, similarly to an inclined surface S320 including a portion in which a main valve element 320 abuts on an auxiliary-valve cap 335 (abutting position CP), a portion located inside in a radial direction of the valve rod 340 is located on a closing direction AX2 side, and a portion located outside in the radial direction of the valve rod 340 is located on an opening direction AX1 side.

[B] Summary

Therefore, in the steam valve 300b of this embodiment, steam flows along the inclined surface S320, thereafter flowing into the auxiliary-valve steam introduction hole H330 smoothly to pass therethrough. As a result, in this embodiment, impurities contained in the steam are less likely to collide with an inlet portion of the auxiliary-valve steam introduction hole H330, which makes it possible to prevent erosion from occurring at the inlet portion of the auxiliary-valve steam introduction hole H330.

Note that in this embodiment, an angle A320 at which the inclined surface S320 including the portion in which the main valve element 320 abuts on the auxiliary-valve cap 335 (abutting position CP) is inclined to the plane orthogonal to the center axis CL is preferably the same as an angle A330 at which the auxiliary-valve steam introduction hole H330 is inclined to the plane orthogonal to the center axis CL (namely, A320=A330). This causes the steam having flowed along the inclined surface S320 to flow into the auxiliary-valve steam introduction hole H330 more smoothly to pass therethrough, which makes it possible to achieve more effective prevention of the erosion.

Third Embodiment

[A] Structure of Steam Valve 300c

Figure 4:
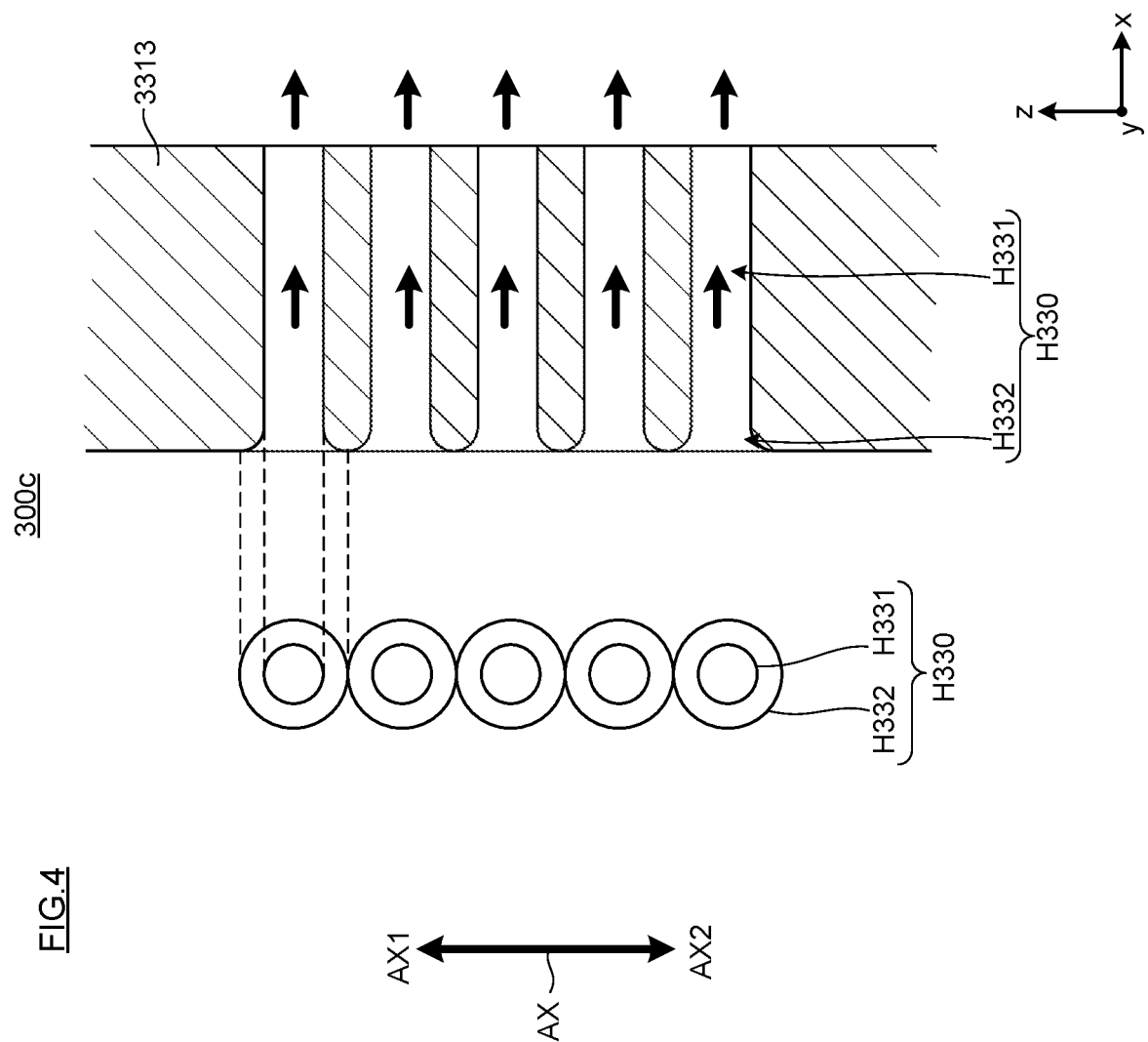
FIG. 4 is a sectional view schematically illustrating a substantial part of a steam valve (main steam stop valve) according to a third embodiment.

FIG. 4 is a sectional view schematically illustrating a substantial part of a steam valve (main steam stop valve) according to a third embodiment. In FIG. 4, a portion through which auxiliary-valve steam introduction holes H330 are formed is enlarged and illustrated. In FIG. 4, a part of the cross section on a vertical plane (xz plane) is enlarged and illustrated in the right portion, as in FIG. 2, and thick arrows correspond to flow of steam. In FIG. 4, the left portion illustrates a state observed when a sight line is along a radial direction of a center axis CL.

In a steam valve 300c of this embodiment, as illustrated in FIG. 4, a structure of an auxiliary-valve steam introduction hole H330 is different from that of the first embodiment. Except for this point and points related thereto, this embodiment is the same as the case of the first embodiment (refer to FIG. 2). Therefore, descriptions of overlapped matters are appropriately omitted.

As illustrated in FIG. 4, in this embodiment, the auxiliary-valve steam introduction hole H330 is formed so that an inlet portion into which the steam flows includes a portion larger in cross-sectional area than an outlet portion from which the steam flows out.

Specifically, the auxiliary-valve steam introduction hole H330 of this embodiment has a first auxiliary-valve steam introduction hole part H331 and a second auxiliary-valve steam introduction hole part H332.

The first auxiliary-valve steam introduction hole part H331, whose cross section is, for example, circular, is formed with a uniform cross-sectional area across from an inlet side into which the steam flows to an outlet side from which the steam flows out.

The second auxiliary-valve steam introduction hole part H332, whose cross section is, for example, circular, is provided to surround the first auxiliary-valve steam introduction hole part H331 at an inlet into which the steam flows, and formed to reduce a cross-sectional area from the inlet side into which the steam flows toward the outlet side from which the steam flows out. Here, the cross-sectional area of the second auxiliary-valve steam introduction hole part H332 on the inlet side is larger than the cross-sectional area of the first auxiliary-valve steam introduction hole part H331, and the cross-sectional area of the second auxiliary-valve steam introduction hole part H332 on the outlet side is the same as the cross-sectional area of the first auxiliary-valve steam introduction hole part H331.

Note that in this embodiment, an inner peripheral surface of the second auxiliary-valve steam introduction hole part H332 is a curved surface, or may be a flat surface. That is, the second auxiliary-valve steam introduction hole part H332 may have a taper shape.

[B] Regarding Flow of Steam

In the steam valve 300c of this embodiment, when an auxiliary valve element 330 is in an open state, a gap is formed on an opening direction AX1 side between a curved surface S335 of an auxiliary-valve cap 335 and an inclined surface S320 of a main valve element 320, and steam passes through the gap (refer to FIG. 2). Therefore, at the inlet of the auxiliary-valve steam introduction hole H330, the steam having passed through the gap flows thereinto, and then, through the auxiliary-valve steam introduction hole H330, the steam flows along a direction orthogonal to a center axis CL.

The steam contains impurities such as a drain and oxides. Therefore, the impurities contained in the steam collide with the inlet portion of the auxiliary-valve steam introduction hole H330, and erosion sometimes occurs at the inlet portion of the auxiliary-valve steam introduction hole H330.

[C] Summary

However, the auxiliary-valve steam introduction hole H330 of this embodiment is formed so that the inlet portion is larger in cross-sectional area than the outlet portion. Therefore, in this embodiment, the steam flows into the auxiliary-valve steam introduction hole H330 smoothly to pass therethrough. As a result, in this embodiment, it is possible to prevent the erosion from occurring at the inlet portion of the auxiliary-valve steam introduction hole H330.

[D] Modified Example

Modified examples of this embodiment will be used and described.

Figure 5:
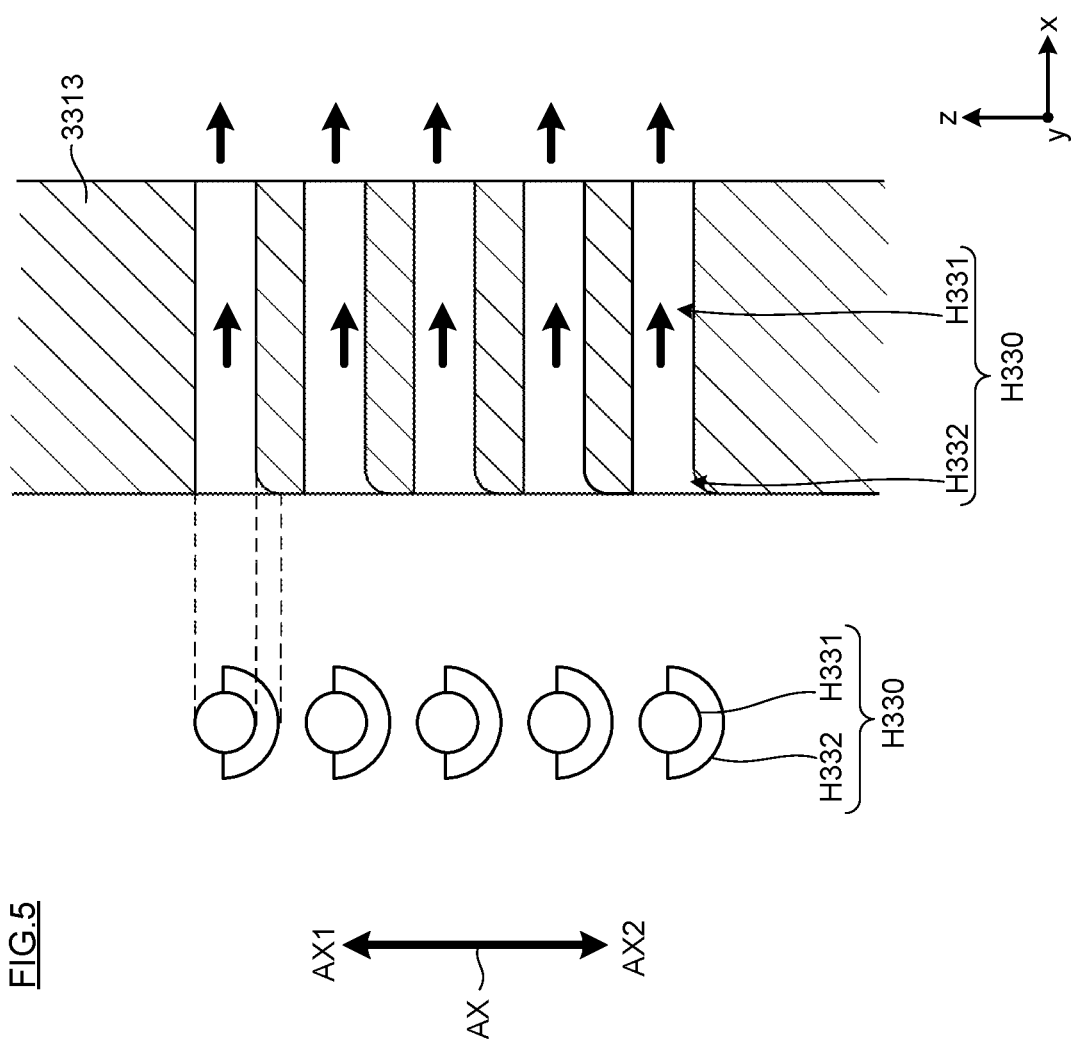
FIG. 5 is a sectional view schematically illustrating a substantial part of a steam valve (main steam stop valve) according to a modified example of the third embodiment.
Figure 6:
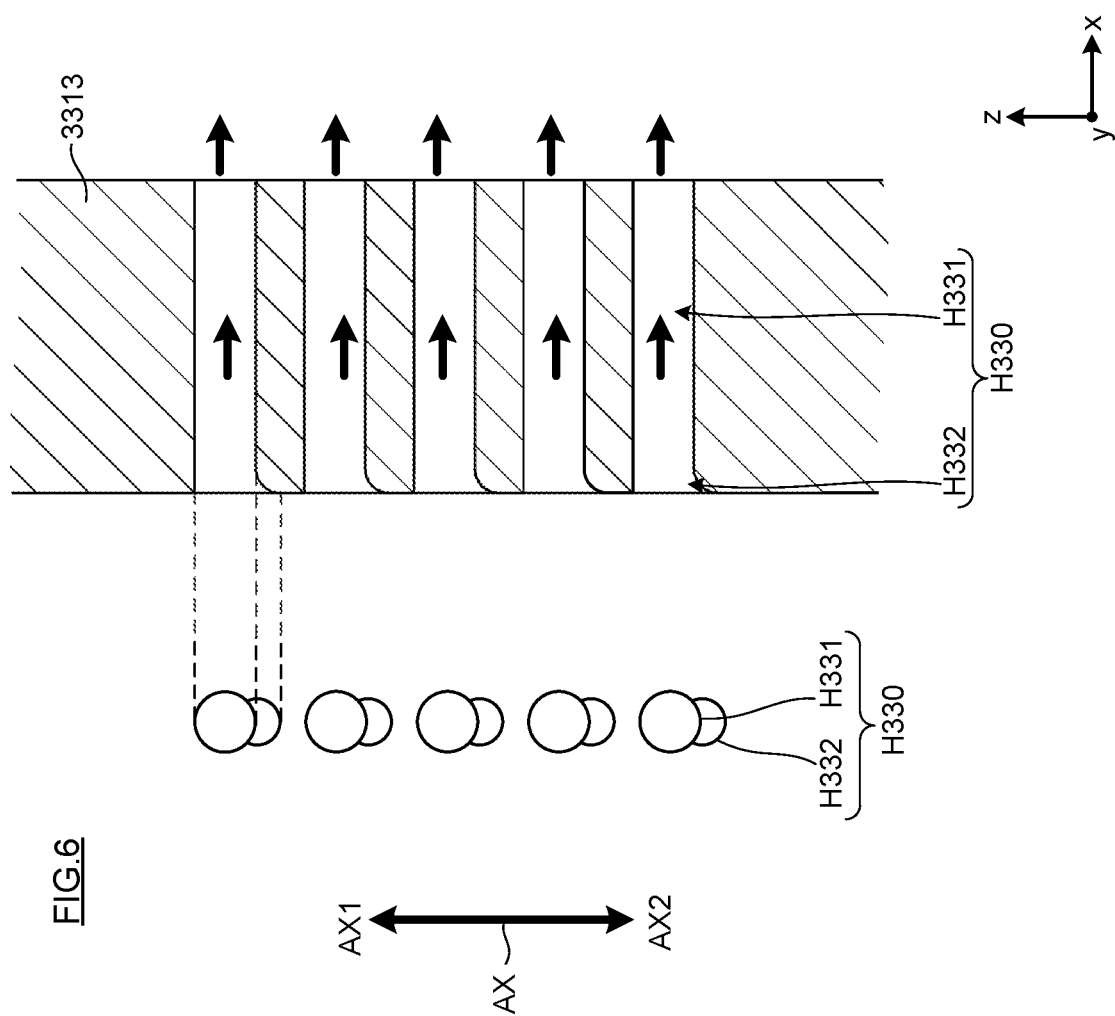
FIG. 6 is a sectional view schematically illustrating a substantial part of a steam valve (main steam stop valve) according to a modified example of the third embodiment.

FIG. 5 and FIG. 6 are sectional views schematically illustrating substantial parts of the steam valves (main steam stop valves) according to modified examples of the third embodiment. In FIG. 5 and FIG. 6, portions through which auxiliary-valve steam introduction holes H330 are formed are enlarged and illustrated, as in FIG. 4.

As illustrated in each of FIG. 5 and FIG. 6, a second auxiliary-valve steam introduction hole part H332 of the auxiliary-valve steam introduction hole H330 is different from that of the above embodiment (refer to FIG. 4), and may be provided on a closing direction AX2 side further than a first auxiliary-valve steam introduction hole part H331 at an inlet into which steam flows.

Concretely, as illustrated in FIG. 5, the second auxiliary-valve steam introduction hole part H332 has a semicircular shape, and may be provided to surround a portion located on the closing direction AX2 side of the first auxiliary-valve steam introduction hole part H331. That is, the second auxiliary-valve steam introduction hole part H332 need not be provided in a portion located on an opening direction AX1 side of the first auxiliary-valve steam introduction hole part H331. As can be seen from FIG. 5, the erosion due to steam is likely to occur because the impurities contained in the steam tend to collide with, in particular, the portion located on the closing direction AX2 side at an inlet portion of the auxiliary-valve steam introduction hole H330. However, in this modified example, similarly to the above embodiment, the second auxiliary-valve steam introduction hole part H332 is provided at the inlet portion of the auxiliary-valve steam introduction hole H330, which makes it possible to prevent the erosion from occurring. In this modified example, the auxiliary-valve steam introduction hole H330 further has a merit of facilitating control of a steam flow rate.

Further, as illustrated in FIG. 6, the second auxiliary-valve steam introduction hole part H332 may be provided in a portion located on the closing direction AX2 side further than the first auxiliary-valve steam introduction hole part H331. That is, the second auxiliary-valve steam introduction hole part H332 need not be provided in a portion other than the portion located on the closing direction AX2 side further than the first auxiliary-valve steam introduction hole part H331. Also in this modified example, in the portion on the closing direction AX2 side in which the erosion is likely to occur at an inlet portion of the auxiliary-valve steam introduction hole H330, the second auxiliary-valve steam introduction hole part H332 is provided. Therefore, also in this modified example, it is possible to prevent the erosion from occurring. Further, in this modified example, the second auxiliary-valve steam introduction hole part H332 can also be formed with a tool used in forming the first auxiliary-valve steam introduction hole part H331, which allows effective processing operation.

OTHERS

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the invention.

REFERENCE SIGNS LIST

100: steam turbine plant, 111: steam generator, 112: reheater, 141: high-pressure turbine, 142: intermediate-pressure turbine, 145: generator, 300: steam valve, 300J: steam valve, 300b: steam valve, 300c: steam valve, 310: valve seat, 320: main valve element, 330: auxiliary valve element, 331: auxiliary-valve main body, 335: auxiliary-valve cap, 340: valve rod, 341: locking pin, 3310: auxiliary-valve tubular part, 3311: first auxiliary-valve main body part, 3312: second auxiliary-valve main body part, 3313: third auxiliary-valve main body part (auxiliary-valve tubular part), 3351: cap tubular body part, 3352: cap plate-shaped body part, AX: axial direction, AX1: opening direction, AX2: closing direction, CL: center axis, CP: abutting position, F331: auxiliary-valve steam flow path, F3311: first auxiliary-valve steam flow path part, F3312: second auxiliary-valve steam flow path part, F3313: third auxiliary-valve steam flow path part, H330: auxiliary-valve steam introduction hole, H331: first auxiliary-valve steam introduction hole part, H332: second auxiliary-valve steam introduction hole part, K310: valve hole, P10: main steam pipe, P11: low-temperature reheat steam pipe, P12: high-temperature reheat steam pipe, S320: inclined surface, S320: accommodation space, S335: curved surface, V10a: main steam stop valve, V10b: steam control valve, V12a: reheat steam stop valve, V12b: intercept valve

What is claimed is:

1. A steam valve comprising:
a main valve element capable of abutting on a valve seat;
an auxiliary valve element accommodated inside the main valve element, and inside which an auxiliary-valve steam flow path is formed; and
a valve rod coupled with the auxiliary valve element, and penetrating a valve hole formed in a valve seat,
the auxiliary valve element comprising:
an auxiliary-valve tubular part being a part capable of protruding from the main valve element in an opening direction in which the main valve element is opened;
an auxiliary-valve steam introduction hole formed through the auxiliary-valve tubular part, and through which steam is introduced to the auxiliary-valve steam flow path; and
an auxiliary-valve cap mounted at an end portion on the opening direction side of the auxiliary-valve tubular part,
the auxiliary valve element being structured to be in an open state in which the valve rod moves in the opening direction to increase a distance between the auxiliary-valve cap and the main valve element, thereby opening the auxiliary-valve steam introduction hole, and
to be in a fully-closed state in which the valve rod moves in a closing direction in which the main valve element is closed to bring the auxiliary-valve cap and the main valve element into contact with each other, thereby closing the auxiliary-valve steam introduction holes, and
a contact position in which the auxiliary-valve cap and the main valve element are brought into contact with each other being located outside in a radial direction of the valve rod from the outer peripheral surface, of the auxiliary-valve tubular part, through which the auxiliary-valve steam introduction holes are formed, wherein
a surface in which the main valve element abuts on the auxiliary-valve cap is an inclined surface inclined from a plane orthogonal to the center axis of the valve rod, and
the auxiliary-valve steam introduction hole is inclined from the plane orthogonal to the center axis of the valve rod.

2. The steam valve according to claim 1, wherein an angle at which the inclined surface is inclined from the plane orthogonal to the center axis of the valve rod is a same as an angle at which the auxiliary-valve steam introduction hole is inclined from the plane orthogonal to the center axis of the valve rod.

3. A steam turbine plant comprising the steam valve according to claim 1.

4. A steam valve comprising:
a main valve element capable of abutting on a valve seat;
an auxiliary valve element accommodated inside the main valve element, and inside which an auxiliary-valve steam flow path is formed; and
a valve rod coupled with the auxiliary valve element, and penetrating a valve hole formed in a valve seat,
the auxiliary valve element comprising:
an auxiliary-valve tubular part being a part capable of protruding from the main valve element in an opening direction in which the main valve element is opened;
an auxiliary-valve steam introduction hole formed through the auxiliary-valve tubular part, and through which steam is introduced to the auxiliary-valve steam flow path; and
an auxiliary-valve cap mounted at an end portion on the opening direction side of the auxiliary-valve tubular part,
the auxiliary valve element being structured to be in an open state in which the valve rod moves in the opening direction to increase a distance between the auxiliary-valve cap and the main valve element, thereby opening the auxiliary-valve steam introduction hole, and
to be in a fully-closed state in which the valve rod moves in a closing direction in which the main valve element is closed to bring the auxiliary-valve cap and the main valve element into contact with each other, thereby closing the auxiliary-valve steam introduction holes, and
a contact position in which the auxiliary-valve cap and the main valve element are brought into contact with each other being located outside in a radial direction of the valve rod from the outer peripheral surface, of the auxiliary-valve tubular part, through which the auxiliary-valve steam introduction holes are formed, wherein in the auxiliary-valve steam introduction hole, a cross-sectional area of an inlet portion into which the steam flows is larger than a cross-sectional area of an outlet portion from which the steam flows out, and the auxiliary-valve steam introduction hole comprises:

a first auxiliary-valve steam introduction hole part formed with a uniform cross-sectional area across from an inlet side into which the steam flows to an outlet side from which the steam flows out; and a second auxiliary-valve steam introduction hole part formed to surround the first auxiliary-valve steam introduction hole part at an inlet into which the steam flows, and to reduce a cross-sectional area from the inlet side into which the steam flows toward the outlet side from which the steam flows out.

5. The steam valve according to claim 4, wherein the auxiliary-valve steam introduction hole comprises:

a first auxiliary-valve steam introduction hole part formed with a uniform cross-sectional area across from an inlet side into which the steam flows to an outlet side from which the steam flows out; and a second auxiliary-valve steam introduction hole part provided in the closing direction further than the first auxiliary-valve steam introduction hole part at an inlet into which the steam flows, and formed to reduce a cross-sectional area from the inlet side into which the steam flows toward the outlet side from which the steam flows out.

6. The steam valve according to claim 5, wherein the second auxiliary-valve steam introduction hole part surrounds a portion located on the closing direction side of the first auxiliary-valve steam introduction hole part.

7. The steam valve according to claim 5, wherein the second auxiliary-valve steam introduction hole part is provided in a portion located on the closing direction side further than the first auxiliary-valve steam introduction hole part.

* * * * *